(12) United States Patent
Barbu et al.

(10) Patent No.: US 8,391,579 B2
(45) Date of Patent: Mar. 5, 2013

(54) METHOD AND SYSTEM FOR AUTOMATIC DETECTION AND SEGMENTATION OF AXILLARY LYMPH NODES

(75) Inventors: Adrian Barbu, Tallahassee, FL (US);
Michael Suehling, Erlangen (DE); Xun (Jason) Xu, Palo Alto, CA (US); David Liu, Princeton, NJ (US); Shaohua Kevin Zhou, Plainsboro, NJ (US); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 255 days.

(21) Appl. No.: 13/041,569

(22) Filed: Mar. 7, 2011

(65) Prior Publication Data

US 2011/0222751 A1    Sep. 15, 2011

Related U.S. Application Data

(60) Provisional application No. 61/312,714, filed on Mar. 11, 2010.

(51) Int. Cl.
*G06K 9/00* (2006.01)
*A61B 5/05* (2006.01)

(52) U.S. Cl. .................. 382/131; 382/154; 600/410

(58) Field of Classification Search .................. 382/100, 382/103, 106–107, 128–134, 154, 155, 162, 382/168, 173, 181, 199, 232, 254, 274, 276, 382/285, 305, 312; 600/410; 378/4, 21
See application file for complete search history.

(56) References Cited

U.S. PATENT DOCUMENTS

| | | | |
|---|---|---|---|
| 7,447,359 B2* | 11/2008 | Tu et al. | 382/173 |
| 2008/0071711 A1 | 3/2008 | Zhang et al. | |
| 2008/0075345 A1 | 3/2008 | Unal et al. | |
| 2008/0101676 A1* | 5/2008 | Zheng et al. | 382/131 |
| 2008/0171932 A1* | 7/2008 | Yan et al. | 600/410 |
| 2008/0298662 A1 | 12/2008 | Periaswamy et al. | |
| 2008/0317314 A1* | 12/2008 | Schwartz et al. | 382/131 |
| 2010/0080434 A1* | 4/2010 | Seifert et al. | 382/131 |

OTHER PUBLICATIONS

Zheng, Y. et al., "Four-Chamber Heart Modeling and Automatic Segmentation for 3D Cardiac CT Volumes Using Marginal Space Learning and Steerable Features", IEEE TMI 27(11), 2008.

* cited by examiner

*Primary Examiner* — Seyed Azarian

(57) ABSTRACT

A method and system for automatically detecting and segmenting lymph nodes in a 3D medical image, such as a CT image, is disclosed. A plurality of lymph node center point candidates are detected in the 3D medical image. A lymph node candidate is segmented for each of the detected lymph node center point candidates. Lymph nodes are detected from the segmented lymph node candidates by verifying the segmented lymph node candidates using a trained lymph node classifier.

25 Claims, 7 Drawing Sheets

FIG. 10

Algorithm 1 Non-maximal Suppression

Input: Candidates $c_i = (x_i, y_i, z_i)$ with scores $p_i > \tau$ and bounding boxes $b_i$.
Output: Set $D$ of detected lymph nodes.
1102 → 1: Find the candidate $c_i$ with highest score $p_i$.
1104 → 2: if $c_i$ exists then initialize $D = \{i\}$ else $D = \emptyset$, stop.
3: for $n = 2$ to $N_{max}$ do
1106 → 4:   Remove candidates $c_j$ inside any box $b_i, i \in D$.
1108 → 5:   Find remaining candidate $c_j$ of highest score $p$.
1110 → 6:   if $c_j$ exists then add $j$ to detected set: $D \leftarrow D \cup \{j\}$ else stop.
7: end for

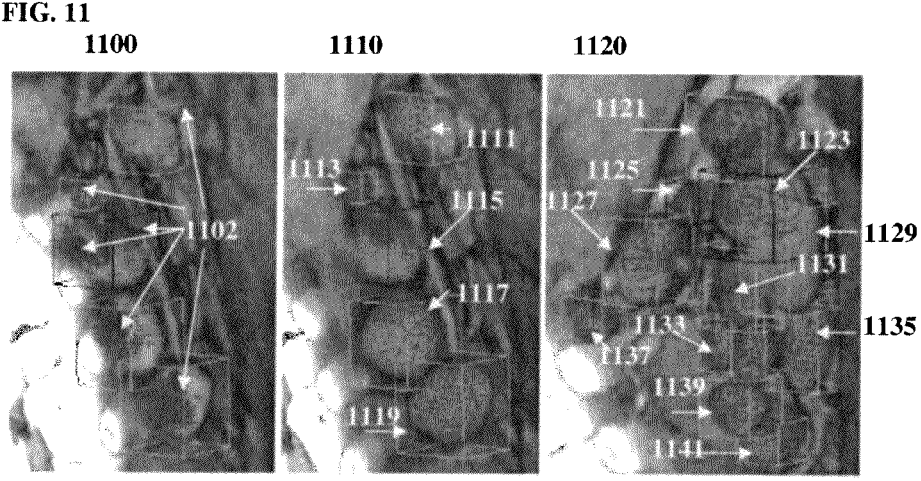

FIG. 11

METHOD AND SYSTEM FOR AUTOMATIC DETECTION AND SEGMENTATION OF AXILLARY LYMPH NODES

This application claims the benefit of U.S. Provisional Application No. 61/312,714, filed Mar. 11, 2010, the disclosure of which is herein incorporated by reference.

BACKGROUND OF THE INVENTION

The present invention relates lymph node detection and segmentation in medical images, and more particularly, to automatic axillary lymph node detection and segmentation in 3D computed tomography (CT) image data.

Lymph node analysis is a difficult task and accounts for a significant part of daily clinical work in the field of Radiology. In particular, lymph node analysis is important for cancer staging and treatment monitoring. Lymph nodes nearby primary cancer regions are routinely assessed by clinicians to monitor disease progress and effectiveness of cancer treatment. This assessment is typically based on 3D computed tomography (CT) data. When the cancer treatment is successful, the lymph nodes decrease in size. Finding the lymph nodes in the CT data is typically time consuming and highly dependent on the observer's experience. Furthermore, when performed manually lymph node measurements are subject inter- and intra-observer variance and human error. Accordingly, automatic lymph node detection and measurement in medical images is desirable.

BRIEF SUMMARY OF THE INVENTION

The present invention provides a method and system for automatic detection and segmentation of lymph nodes in 3D medical image data. Embodiments of the present invention utilize a robust and effective learning-based method for the automatic detection and segmentation of solid lymph nodes in 3D medical images.

In one embodiment of the present invention, a plurality of lymph node center point candidates are detected in the 3D medical image. A lymph node candidate is segmented for each of the detected lymph node center point candidates. Lymph nodes are detected from the segmented lymph node candidates by verifying the segmented lymph node candidates using a trained lymph node classifier. A target region, such as an axillary region, may be extracted in the 3D medical image, and the detection of lymph node center point candidates may be constrained to the extracted target region.

These and other advantages of the invention will be apparent to those of ordinary skill in the art by reference to the following detailed description and the accompanying drawings.

BRIEF DESCRIPTION OF THE DRAWINGS

FIG. 10 illustrates pseudo-code for implementing a non-maximal suppression algorithm for detecting lymph nodes according to an embodiment of the present invention;

FIG. 11 illustrates exemplary results of the lymph node detection and segmentation method of FIG. 1.

DETAILED DESCRIPTION

The present invention is directed to a method and system for automatic detection and segmentation of lymph nodes in 3D medical images, such as computed tomography (CT) and magnetic resonance (MR) images. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention provide a method that uses a learned-based approach for lynch node detection based on Marginal Space Learning (MSL). Embodiments of the present invention utilize an efficient Markov Random Field (MRF) based segmentation method for segmenting solid lymph nodes. In addition, embodiments of the present invention utilize two new sets of features, one set that is self-aligning to local gradients and another set that is based on the lymph node segmentation results. According to an embodiment of the present invention, in order to detect and segment axillary lymph nodes in a 3D medical image, the axillary regions can be automatically extracted in the image and lymph node center candidates can be detected in the axillary regions using a two-stage detector. A corresponding lymph node model is segmented for each detected lymph node center candidate, and a verification stage is used to determine which of the lymph node models are actually lymph nodes.

Figure 1:
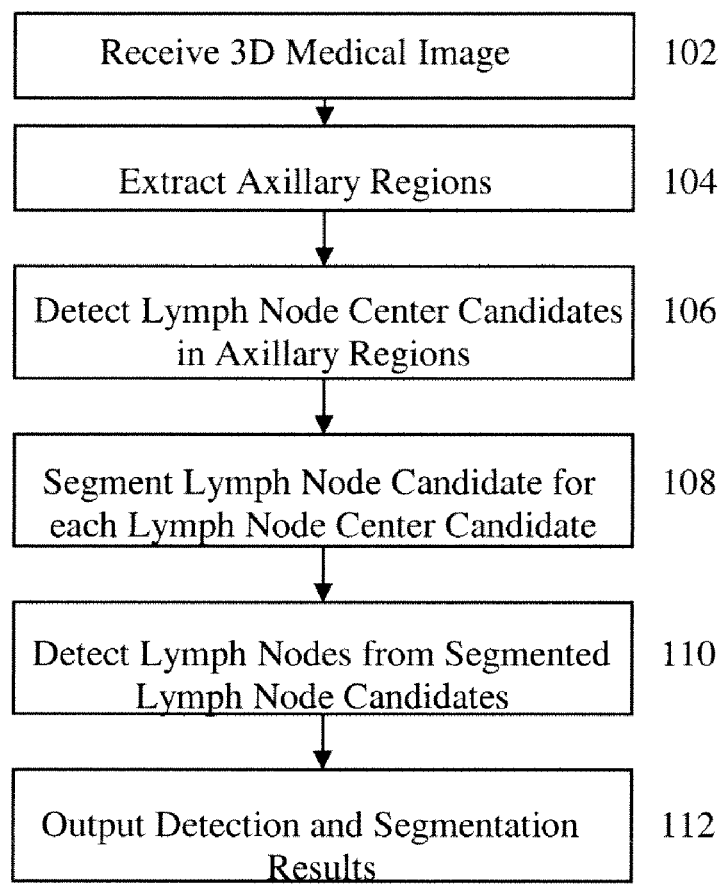
FIG. 1 illustrates a method of detecting and segmenting axillary lymph nodes in a 3D medical image according to an embodiment of the present invention.

FIG. 1 illustrates a method of detecting and segmenting axillary lymph nodes in a 3D medical image according to an embodiment of the present invention. The method of FIG. 1 transforms the medical image data representing a patient's anatomy to detect locations of the patient's lymph nodes and segment the shape of the patient's lymph nodes. Although FIG. 1 illustrates a method of detecting and segmenting axillary lymph nodes, it is to be understood that the method may be similarly applied to regions other than the axillary regions (e.g., the pelvic region, etc.) in order to detect lymph nodes in different target regions.

At step 102, a 3D medical image is received. The medical image can be a 3D medical image (volume) generated using an imaging modality, such as CT and MR. The medical image can also be a 3D medical image generated using a hybrid imaging modality, such as PET/CT and PET/MR. The medical image can be received directly from an image acquisition device (e.g., MR scanner, CT scanner, etc.). It is also possible that the medical image can be received by loading a medical image that was previously stored, for example on a memory or storage of a computer system or a computer readable medium. In the examples described herein, lymph nodes are detected and segmented in 3D CT image data, however the present invention is not limited thereto.

At step 104, axillary regions are automatically extracted in the 3D medical image. In particular, in order to constrain the search for lymph nodes, the two axillary regions (left and right) are automatically detected in the 3D medical image and cropped to generate axillary subvolumes. In an advantageous embodiment, the axillary regions can be detected based on a location of the lung tips in the 3D medical image. The lung tips can be automatically detected in the 3D medical image using the method described in United States Published Patent Application No. 2010/0080434, which is incorporated herein by reference. The left and right axillary regions can be extracting by extracting a subvolume of a predetermined size located at a predetermined location with respect to the detected left and right lung tips, respectively. For example, in an advantageous implementation, relative to the left lung tip location ($x_L, y_L, z_L$) and the right lung tip location ($x_R, y_R, z_R$), subvolumes of size 220×220×220 voxels (at 1.5 mm resolution) can be cropped, with the upper left corner of the left axillary subvolume located at ($x_L+20, y_L-135, z_L-131$), and the upper right corner of the right axillary subvolume located at ($x_R-20, y_R-135, z_R-131$).

At step 106, lymph node center candidates are detected in the axillary regions. In particular, trained lymph node center detectors are used to detect the positions of lymph node center candidates in the axillary subvolumes while ignoring the size the lymph nodes. The lymph node center candidates can be detected in multiple stages using different trained lymph node center detectors trained based on different features using annotated training data.

Figure 2:
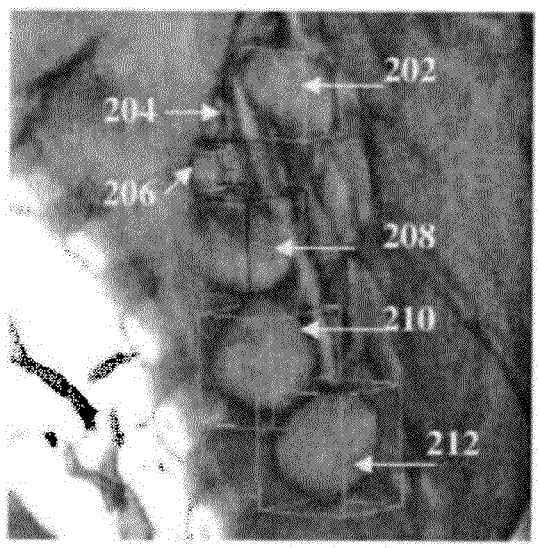
FIG. 2 illustrates exemplary lymph node annotations for training lymph node center detectors.

FIG. 2 illustrates exemplary lymph node annotations for training the lymph node center detectors. As shown in FIG. 2, axillary lymph nodes 202, 204, 206, 208, 210, and 212 are annotated in a training image. The lymph nodes 202, 204, 206, 208, 210, and 212 are annotated by placing bounding boxes around them. Voxels within the annotated lymph nodes 202, 204, 206, 208, 210, and 212 are used as positive training samples and voxels not within the annotated lymph nodes are used as negative training samples for training the lymph node center detectors. According to a possible implementation, all lymph nodes having a size of at least 10 mm can be annotated. The annotated lymph nodes 202, 204, 206, 208, 210, and 212 in the training image are also labeled as solid or non-solid depending on whether they have a homogenous interior or not. In FIG. 2, annotated lymph nodes 202, 206, 210 and 210 are solid lymph nodes and annotated lymph nodes 204 and 206 are non-solid lymph nodes. Enlarged lymph nodes with a solid interior are of particular clinical interest since they are believed to have a higher probability of being malignant than non-solid lymph nodes that, for example, have a fatty core. Lymph nodes are annotated in many training volumes to provide a large number of training samples to train the lymph node center detectors.

Figure 3:
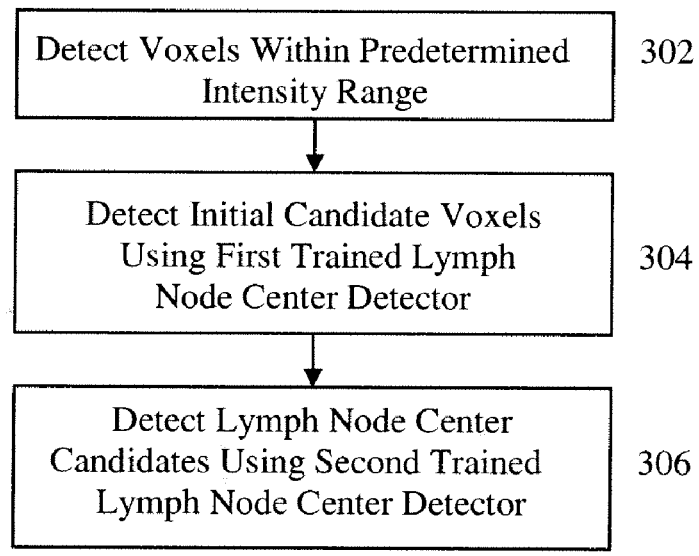
FIG. 3 illustrates a method of detecting lymph node center candidates in an axillary region according to an embodiment of the present invention.

FIG. 3 illustrates a method of detecting lymph node center candidates in an axillary region according to an embodiment of the present invention. The method of FIG. 3 can be used to implement step 106 of FIG. 1. As illustrated in FIG. 3, at step 302, voxels within a predetermined intensity range are detected. In particular, the search for lymph node center candidates can be constrained to the intensity range of soft tissue. For example, voxels with intensity in the interval [−100,200] HU can be further processed in step 304 and voxels not within that interval can be eliminated from consideration.

At step 304, a set of initial candidate voxels can be detected using a trained first lymph node center detector based on Haar features. In particular, the voxels that are detected within the predetermined intensity range in step 302 are evaluated using a fast detector based on Haar features to detect the set of initial candidate voxels. The first lymph node center detector may be trained using a probabilistic boosting tree (PBT) classifier and 3D Haar features based on the annotated training data. The trained first lymph node center detector extracts 3D Haar features associated with a voxel being evaluated and calculates a probability that the voxel is a lymph node center based on the extracted 3D Haar features. Voxels with a probability higher than a certain threshold are further evaluated at step 306. It is also possible that the trained first lymph node center detector is actually a cascade of PBT classifiers, with each successive PBT classifier including a larger number of weak classifiers, in order incrementally eliminate less likely candidates while performing fewer calculations.

At step 306, lymph node center candidates are detected from the initial candidate voxels using a trained second lymph node center detector based on self-aligning features that self-align to high gradients in the image. The self-aligning features are not extracted at a particular fixed location with respect to each voxel, but extracted at a location that varies according to the gradient in the neighborhood of each voxel. Accordingly, the self-aligning features can be used to accurately detect lymph nodes independently of the size of the lymph nodes detected.

Figure 4:
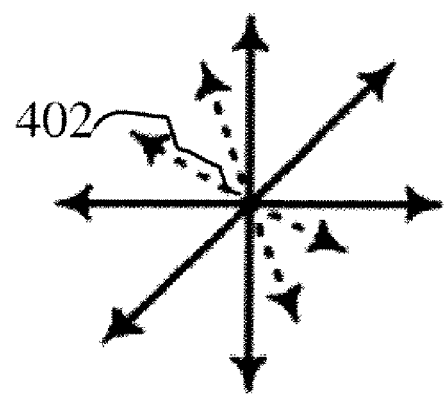
FIG. 4 illustrates exemplary directions from a candidate location for extracting self-aligning features.

The self-aligning features are calculated along a predetermined number of directions from a candidate location. In an advantageous implementation, the self-aligning features can be calculated along rays in 14 directions in 3D space from each candidate location. These 14 directions are (±1,0,0), (0,±1,0), (0,0,±1), and (±1,±1,±1). FIG. 4 illustrates exemplary directions from a candidate location 402 for extracting self-aligning features. In particular, FIG. 4 shows 10 of the 14 directions from a candidate location 402, along which the self-aligning features are extracted.

Figure 5:
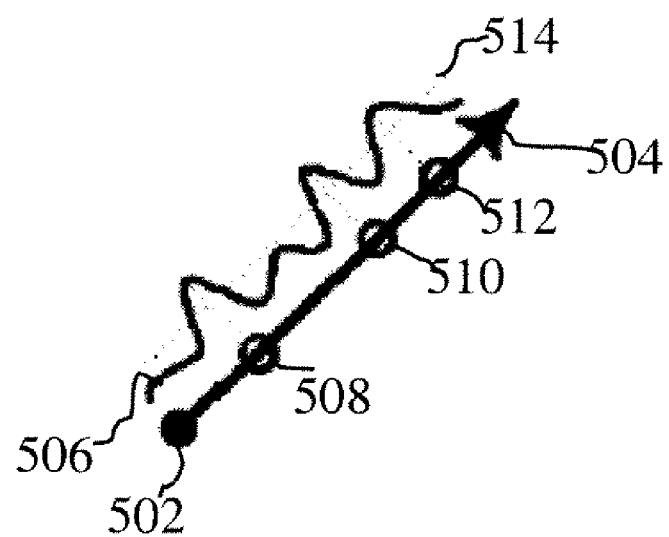
FIG. 5 illustrates an example of finding local gradient maxima.

In an exemplary embodiment, in each direction $d_i$, $1 \leq i \leq 14$, local maxima of the gradient above each of 10 thresholds $\tau_j = 10j$, $1 \leq j \leq 10$, can be found at each of three scales $s_k = 1/2^k$, $1 \leq k \leq 3$, and features can be extracted at the determined local maxima locations. FIG. 5 illustrates an example of finding local gradient maxima. As illustrated in FIG. 5, arrow 504 represents a particular direction from candidate location 502, and the gradient 506 is shown along that direction 504. Locations 508, 510, and 512 correspond to the first three local maxima of the gradient 506 above a certain threshold 514. For each of the 14 directions, such local gradient maxima locations can be determined for each of 10 thresholds at each of 3 scales, and features can be extracted at the determined local maxima locations. According to an advantageous implementation, the following features can be extracted:

Each of the 24 local features (e.g., gradient magnitude, angle, intensity value, etc.) described in Y. Zheng et al., "Four-Chamber Heart Modeling and Automatic Segmentation for 3D Cardiac CT Volumes Using Marginal Space Learning and Steerable Features", *IEEE TMI*, 27(11), 2008, which is incorporated herein by reference, at each of the first three local maxima locations for each $d_i$, $\tau_j$, and $s_k$.

Each of the 24 local features calculated half way between the candidate location and each of the first three local maxima locations for each $d_i$, $\tau_j$, and $s_k$.

The distance to each of the first three local maxima locations for each $d_i$, $\tau_j$, and $s_k$.

The differences between distances to the corresponding first three local maxima in each combination of two different directions $d_i$ for each $\tau_j$ and $s_k$.

In the above described implementation, approximately 64,000 features are extracted for each candidate location. At least one PBT classifier is trained as the second lymph node center detector based on the self-aligning features using the annotated training data. In an exemplary implementation, a cascade of three PBT classifiers can be trained as the second lymph node center detector.

The trained second lymph node center detector extracts the self-aligning features for each initial candidate voxel detected in step 304 and calculates a probability for each initial candidate voxel is a lymph node center. A predetermined number of candidates with the highest probabilities above a threshold are kept as the lymph node center candidates for each axillary subvolume. For example, in one advantageous implementation, the trained second lymph node center detector detects the best 1500 lymph node center candidates having probabilities above a certain threshold.

Figure 6:
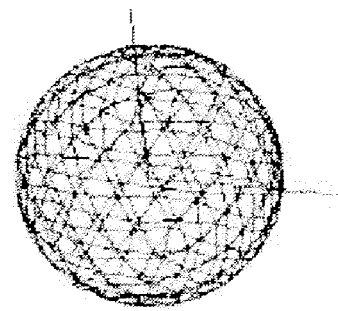
FIG. 6 illustrates a triangulation of sphere to form a lymph node shape model.

Returning to FIG. 1, at step 108, a lymph node candidate is segmented for each of the detected lymph node center candidates. The segmentation for each lymph node center candidate can be performed using a segmentation procedure that is specially designed by the present inventors for detecting clinically highly relevant solid lymph nodes. The solid lymph nodes have a blob-like shape that can be describes using a radial function $r:S^2 \to \mathbb{R}$ defined on the sphere in 3D, representing the distance from the lymph node center to the boundary of the lymph node in all directions. According to an embodiment of the present invention, the sphere, which is used to model the shape of the lymph node, is discretized with using triangulation with 162 vertices, 480 edges, and 320 triangles. FIG. 6 illustrates a triangulation of sphere to form the lymph node model. The lymph node model of FIG. 6 can be fit to the image data at each lymph node center candidate in order to obtain a fast lymph node segmentation at each lymph node center candidate.

Each of the 162 sphere vertices represents a direction $d_i$. Given a detected lymph node center candidate location C, a segmentation using this location as the center is determined by the radii $r_i$, $i=1, \ldots, N$ for all directions $d_i$, where $N=162$ in this implementation. These radii form a vector $r=(r_i, \ldots, r_N)$. Lymph nodes exhibit a high shape variability, making it difficult to describe them using generative models such as principle component analysis (PCA). According to an embodiment of the present invention, in order to find the segmentation vector r, an approach similar to active shape models can be used, but using a Gaussian Markov Random Field (MRF) instead of a PCA model, and applying a robust data cost and gradient optimization.

Given the candidate location C, the most likely lymph node boundary locations (i.e., vertices of the sphere lymph node model) $y_i$, $i=1, \ldots, 162$ are determined in each direction $d_i$ as $$y_i = \arg\min_{r \in (0, R_{max})} |I(C) - I(C + (r+1)d_i)| > 50. \quad (1)$$

Figure 7:
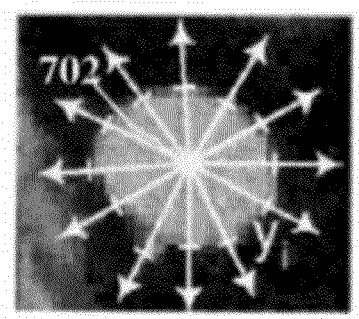
FIG. 7 illustrates the determination of the most likely lymph node boundary in each direction from a lymph node center candidate.

FIG. 7 illustrates the determination of the most likely lymph node boundary $y_i$ in each direction from a lymph node center candidate 702. After obtaining the measurement vector $y=(y_1, \ldots, y_{162})$, the segmentation r is calculated by minimizing the following energy function:

$$E(r) = \alpha \sum_i \rho(r_i - y_i) + \sum_i \frac{1}{2|\partial i|} \sum_{j \in \partial i} (r_i - r_j)^2, \quad (2)$$

where $p(x) = \ln(1 + x^2/2)$, and $\partial_i$ denotes the neighbors of i on the sphere mesh. The first term of the energy function is the data term and the second term is the Gaussian MRF prior. $\alpha$ is a weight that can be used to weight the importance of the image data (data term) relative to the sphere shape (Gaussian MRF prior term). If a measurement $y_i$ does not exist, its corresponding term is removed from the data term of equations (2).

Figure 8:
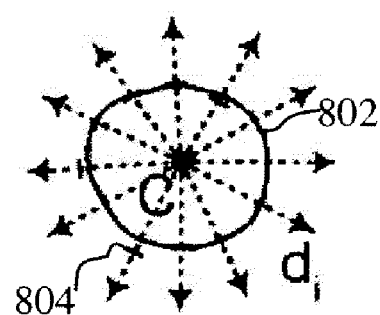
FIG. 8 shows an exemplary lymph node model segmented for a lymph node center candidate.

The use of the robust energy function of equation (2) to fit the lymph node model to the image for a candidate center location ensures that any sporadic outliers in the measurements $y_i$ are ignored. FIG. 8 shows an exemplary lymph node model 802 segmented for a lymph node center candidate C. As shown in FIG. 8, the segmentation obtains a smooth result that fits the measurements in most directions $d_i$, while ignoring outliers such as measurement 804.

Minimization of the energy function can be implemented using gradient descent, starting with r=y as the initialization. The energy gradient can be calculated analytically, resulting in the update iteration:

$$r_i \leftarrow r_i - \eta \left( \alpha \frac{r_i - y_i}{1 + (r_i - y_i)^2/2} + r_i - \frac{\sum_{j \in \partial i} r_j}{|\partial i|} \right), \quad (3)$$

where $\eta$ is a parameter that controls the step size of how much the vertices can be adjusted in each iteration. According to an exemplary implementation, $\eta=0.1$ and 1000 gradient update iterations can be used, while $\alpha=1.6$.

Returning to FIG. 1, at step 110, lymph nodes are detected in each of axillary regions by verifying the segmented lymph node candidates using a trained lymph node classifier. As described above, each segmented lymph node candidate is a sphere-like lymph node model having 162 vertices. This segmentation is used to obtain more informative features for a final evaluation of the lymph node candidates.

Figure 9:
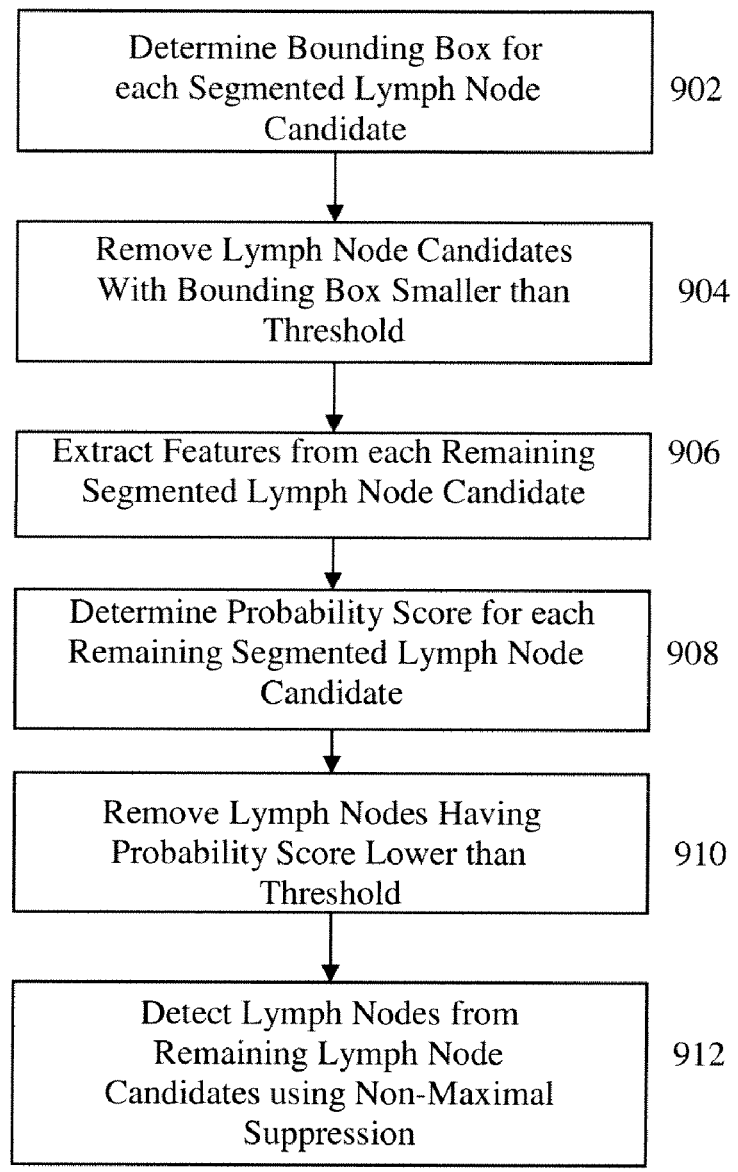
FIG. 9 illustrates a method for verifying segmented lymph node candidates according to an embodiment of the present invention.

FIG. 9 illustrates a method for verifying segmented lymph node candidates according to an embodiment of the present invention. The method of FIG. 9 can be used to implement step 110 of FIG. 1. As illustrated in FIG. 9, at step 902, a bounding box is determined for each lymph node candidate based on the segmentation of each lymph node candidate. At step 904, all lymph node candidates whose bounding box size is smaller than a certain threshold are automatically removed. For example, any bounding boxes that are smaller than 9 mm may be automatically rejected.

At step 906, a set of features is extracted from each remaining segmented lymph node candidate. According to an advantageous implementation, the features may be extracted for each segmented lymph node candidate as described below:

1) Each of the 24 local features (e.g., gradient magnitude, angle, intensity value, etc.) described in Y. Zheng et al., "Four-Chamber Heart Modeling and Automatic Segmentation for 3D Cardiac CT Volumes Using Marginal Space Learning and Steerable Features", *IEEE TMI*, 27(11), 2008, which is incorporated herein by reference, are calculated at each of the 162 vertices. For each local feature, the 162 values are sorted in decreasing order.

2) For each of the 24 local features, the 81 sums of feature values of pairs of opposite vertices are calculated and sorted in decreasing order.

3) The 81 diameters (i.e., distances between opposite vertices relative to the segmentation center) are sorted in decreasing order. For each diameter, the following features are calculated:
   a) The size of each diameter.
   b) The asymmetry of each diameter, i.e., the ratio of the larger radius over the smaller radius.
   c) The ratio of the i-th sorted diameter and the j-th sorted diameter for all $i<j\leq 81$.
   d) For each of the 24 local features, the maximum and/or minimum feature values at the two diameter ends.
   e) For each of the 24 local feature types, the maximum and/or minimum of the feature values half way to the diameter end vertices.

In the above described implementation, there are approximately 17,000 features. A lymph node classifier is trained based on annotated training data using these features. For example, PBT classifier may be trained using these features. Alternatively, a random forest (RF) classifier may be trained using these features.

At step 908, a probability score is determined for each of the remaining lymph node candidate based on the extracted features using the trained lymph node classifier. The classifier assigns a probability score $p_i$ to each lymph node candidate i, a higher score meaning a higher likelihood that the candidate is a lymph node. At step 910, all lymph node candidates with a probability score $p_i$ a threshold $\tau$ are automatically removed.

At step 910, a non-maximal suppression algorithm is used to detect the lymph nodes from the remaining lymph node candidates. FIG. 10 illustrates pseudo-code for implementing a non-maximal suppression algorithm for detecting lymph nodes according to an embodiment of the present invention. As illustrated in FIG. 10, the non-maximal suppression algorithm inputs the set of lymph node candidates with probability scores $p_i$ greater than the threshold $\tau$ and their corresponding bounding boxes $b_i$, and outputs a set of detected lymph nodes. Referring to FIG. 10, at step 1002, the lymph node candidate with the highest probability score is determined. At step 1004, if the candidate exists then the set of detected lymph nodes is initialized and the candidate is included as a detected lymph node. If there are no candidates with a probability score higher than the threshold, then no lymph nodes are detected and the algorithm stops. At step 1006, any candidates with center points inside the bounding box of any detected lymph node are removed. At step 1008, the remaining candidate with the highest probability score is determined. At step 1010, if the candidate exists, then the candidate is included in the set of detected lymph nodes. If there are no remaining candidates, then the algorithm stops. Steps 1006, 1008, and 1010 are repeated until no candidates remain or until a maximum number of lymph nodes ($N_{max}$) are detected. Accordingly, the non-maximal suppression algorithm repeats adding the candidate of the highest score and removing all candidates close to it.

According to an exemplary implementation, $N_{max}=25$ can be selected, so that in each axillary region a maximum of 25 lymph nodes are detected.

Returning to FIG. 1, at step 112, the lymph node detection and segmentation results are output. The lymph node detection and segmentation results may be output by displaying the segmentations of the detected lymph nodes, for example on a display device of a computer system. The lymph node detection results may also be output by storing the results, for example on a memory or storage of a computer system or on a computer readable medium.

FIG. 11 illustrates exemplary results of the lymph node detection and segmentation method of FIG. 1. As illustrated in FIG. 11, image 1100 shows detected lymph node center candidates 1101 resulting from step 106 of FIG. 1. Image 1110 shows segmented lymph nodes 1111, 1113, 1115, 1117, and 1119 detected using the method of FIG. 1. Image 1120, shows segment lymph nodes 1121, 1123, 1125, 1127, 1129, 1131, 1133, 1135, 1137, 1139, and 1141 detected using the method of FIG. 1. As shown in image 1120 of FIG. 11, the method of FIG. 1 can detect parts of lymph node conglomerates.

Figure 12:
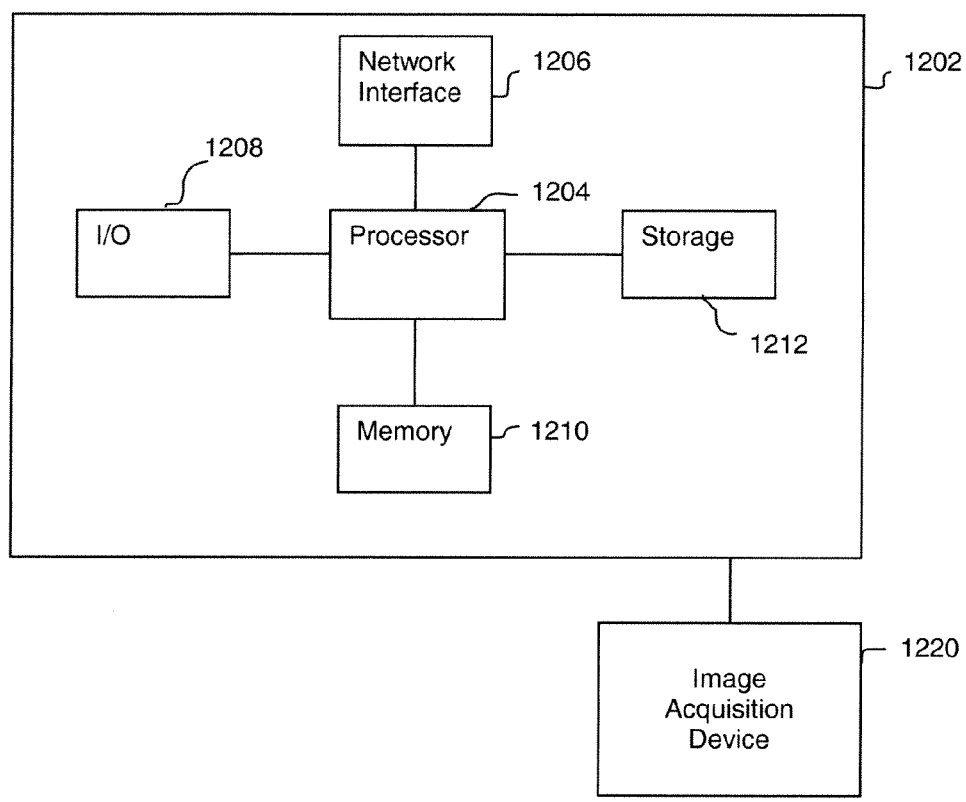
FIG. 12 is a high level block diagram of a computer capable of implementing the present invention.

The above-described methods for automatic detection and segmentation of lymph nodes may be implemented on a computer using well-known computer processors, memory units, storage devices, computer software, and other components. A high level block diagram of such a computer is illustrated in FIG. 12. Computer 1202 contains a processor 1204 which controls the overall operation of the computer 1202 by executing computer program instructions which define such operations. The computer program instructions may be stored in a storage device 1212, or other computer readable medium (e.g., magnetic disk, CD ROM, etc.) and loaded into memory 1210 when execution of the computer program instructions is desired. Thus, the steps of the methods of FIGS. 1, 3, 9, and 10 may be defined by the computer program instructions stored in the memory 1210 and/or storage 1212 and controlled by the processor 1204 executing the computer program instructions. An image acquisition device 1220, such as a CT scanning device or an MR scanning device, can be connected to the computer 1202 to input medical images to the computer 1202. It is possible to implement the image acquisition device 1220 and the computer 1202 as one device. It is also possible that the image acquisition device 1220 and the computer 1202 communicate wirelessly through a network. The computer 1202 also includes one or more network interfaces 1206 for communicating with other devices via a network. The computer 1202 also includes other input/output devices 1208 that enable user interaction with the computer 1202 (e.g., display, keyboard, mouse, speakers, buttons, etc.). One skilled in the art will recognize that an implementation of an actual computer could contain other components as well, and that FIG. 12 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting and segmenting lymph nodes in a 3D medical image, comprising:

detecting a plurality of lymph node center candidates in the 3D medical image;

segmenting a plurality of lymph node candidates in the 3D medical image, each one of the segmented lymph node candidates corresponding to one on the detected lymph node center candidates;

detecting at least one lymph node from the segmented lymph node candidates by verifying the segmented lymph node candidates using a trained lymph node classifier; and extracting at least one target region in the 3D medical image, wherein the step of detecting a plurality of lymph node center candidates is constrained to the at least one target region.

2. The method of claim 1, wherein:

the step of extracting at least one target region comprises extracting a left axillary region and a right axillary region in the 3D medical image; and the step of detecting a plurality of lymph node center candidates comprises detecting a plurality of lymph node center candidates in each of the left axillary region and the right axillary region.

3. The method of claim 2, wherein the step of extracting a left axillary region and a right axillary region in the 3D medical image comprises:

detecting a left lung tip and a right lung tip in the 3D medical image; and defining the left axillary region based on the detected left lung tip and the right axillary region based on the detected right lung tip.

4. The method of claim 1, wherein the step of detecting a plurality of lymph node center candidates comprises:

detecting a plurality of initial lymph node center candidates in the 3D medical image using a trained first lymph node center detector based on Haar features; and detecting the plurality of lymph node center candidates from the plurality of initial lymph node center candidates using a trained second lymph node center detector based on self-aligning features associated with each of the initial lymph node center candidates.

5. The method of claim 4, wherein the step of detecting the plurality of lymph node center candidates from the plurality of initial lymph node center candidates using a trained second lymph node center detector based on self-aligning features associated with each of the initial lymph node center candidates comprises:

extracting the self-aligning features for each initial lymph node center candidate by calculating a plurality of local features in each of a plurality of directions from each initial lymph node center candidate at locations of local gradient maxima above each of a plurality of thresholds, at each of a plurality scales.

6. The method of claim 4, further comprising:

detecting voxels within a predetermined intensity range, wherein the step of detecting a plurality of initial lymph node center candidates in the 3D medical image using a trained first lymph node center detector is constrained to the detected voxels within the predetermined intensity range.

7. The method of claim 1, wherein the step of segmenting a plurality of lymph node candidates in the 3D medical image comprises:

fitting a Gaussian Markov Random Field shape model to the 3D medical image at each of the lymph node center candidates.

8. The method of claim 7, wherein the Gaussian Markov Random Field shape model is a sphere having a plurality vertices on a surface of the sphere, and the step of fitting a Gaussian Markov Random Field shape model to the 3D medical image at each of the lymph node center candidates comprises, for each lymph node center candidate:

determining a distance between the lymph node center candidate and each of the vertices of the shape model by minimizing an energy function having a data term based on intensities in the 3D medical image and a shape term based on the Gaussian Markov Random Field shape model.

9. The method of claim 1, wherein the step of detecting at least one lymph node from the segmented lymph node candidates by verifying the segmented lymph node candidates using a trained lymph node classifier comprises:

(a) extracting a plurality of features from each of the segmented lymph node candidates;

(b) determining a probability score for each of the segmented lymph node candidates based on the extracted features using the trained lymph node classifier;

(c) detecting one of the segmented lymph node candidates having the highest probability score above a threshold as a lymph node;

(d) removing any segmented lymph node candidates having a center located within a bounding box associated with the one of the segmented lymph node candidates detected as a lymph node; and (e) repeating steps (c) and (d) until one of no segmented lymph node candidates remain having a probability score above the threshold and a maximum number of detected lymph nodes is reached.

10. The method of claim 9, wherein the step of detecting at least one lymph node from the segmented lymph node candidates by verifying the segmented lymph node candidates using a trained lymph node classifier further comprises:

removing any of the segmented lymph node candidates smaller than a predetermined size prior to step (a).

11. An apparatus for detecting and segmenting lymph nodes in a 3D medical image, comprising:

means for detecting a plurality of lymph node center candidates in the 3D medical image;

means for segmenting a plurality of lymph node candidates in the 3D medical image, each one of the segmented lymph node candidates corresponding to one on the detected lymph node center candidates;

means for detecting at least one lymph node from the segmented lymph node candidates by verifying the segmented lymph node candidates using a trained lymph node classifier; and means for extracting at least one target region in the 3D medical image, wherein the means for detecting a plurality of lymph node center candidates comprises means for detecting the plurality of lymph node center candidates within the at least one target region.

12. The apparatus of claim 11, wherein the means for detecting a plurality of lymph node center candidates comprises:

means for detecting a plurality of initial lymph node center candidates in the 3D medical image using a trained first lymph node center detector based on Haar features; and means for detecting the plurality of lymph node center candidates from the plurality of initial lymph node center candidates using a trained second lymph node center detector based on self-aligning features associated with each of the initial lymph node center candidates.

13. The apparatus of claim 12, wherein the means for detecting the plurality of lymph node center candidates from the plurality of initial lymph node center candidates using a trained second lymph node center detector based on self-aligning features associated with each of the initial lymph node center candidates comprises:
    means for extracting the self-aligning features for each initial lymph node center candidate by calculating a plurality of local features in each of a plurality of directions from each initial lymph node center candidate at locations of local gradient maxima above each of a plurality of thresholds, at each of a plurality scales.

14. The apparatus of claim 11, wherein the means for segmenting a plurality of lymph node candidates in the 3D medical image comprises:
    means for fitting a Gaussian Markov Random Field shape model to the 3D medical image at each of the lymph node center candidates.

15. The apparatus of claim 14, wherein the Gaussian Markov Random Field shape model is a sphere having a plurality vertices on a surface of the sphere, and the means for fitting a Gaussian Markov Random Field shape model to the 3D medical image at each of the lymph node center candidates comprises:
    means for determining a distance between a lymph node center candidate and each of the vertices of the shape model by minimizing an energy function having a data term based on intensities in the 3D medical image and a shape term based on the Gaussian Markov Random Field shape model.

16. The apparatus of claim 11, wherein the means for detecting at least one lymph node from the segmented lymph node candidates by verifying the segmented lymph node candidates using a trained lymph node classifier comprises:
    means for extracting a plurality of features from each of the segmented lymph node candidates;
    means for determining a probability score for each of the segmented lymph node candidates based on the extracted features using the trained lymph node classifier; and
    means for detecting at least one lymph node from the segmented lymph node candidates using non-maximal suppression.

17. A non-transitory computer readable medium encoded with computer executable instructions for detecting and segmenting lymph nodes in a 3D medical image, the computer executable instructions defining steps comprising:
    detecting a plurality of lymph node center candidates in the 3D medical image;
    segmenting a plurality of lymph node candidates in the 3D medical image, each one of the segmented lymph node candidates corresponding to one on the detected lymph node center candidates;
    detecting at least one lymph node from the segmented lymph node candidates by verifying the segmented lymph node candidates using a trained lymph node classifier; and extracting at least one target region in the 3D medical image, wherein the step of detecting a plurality of lymph node center candidates is constrained to the at least one target region.

18. The computer readable medium of claim 17, wherein:
    the computer executable instructions defining the step of extracting at least one target region comprise computer executable instructions defining the step of extracting a left axillary region and a right axillary region in the 3D medical image; and
    the computer executable instructions defining the step of detecting a plurality of lymph node center candidates comprise computer executable instructions defining the step of detecting a plurality of lymph node center candidates in each of the left axillary region and the right axillary region.

19. The computer readable medium of claim 17, wherein the computer executable instructions defining the step of detecting a plurality of lymph node center candidates comprise computer executable instructions defining the steps of:
    detecting a plurality of initial lymph node center candidates in the 3D medical image using a trained first lymph node center detector based on Haar features; and
    detecting the plurality of lymph node center candidates from the plurality of in lymph node center candidates using a trained second lymph node center detector based on self-aligning features associated with each of the initial lymph node center candidates.

20. The computer readable medium of claim 19, wherein the computer executable instructions defining the step of detecting the plurality of lymph node center candidates from the plurality of initial lymph node center candidates using a trained second lymph node center detector based on self-aligning features associated with each of the initial lymph node center candidates comprise computer executable instructions defining the step of:
    extracting the self-aligning features for each initial lymph node center candidate by calculating a plurality of local features in each of a plurality of directions from each initial lymph node center candidate at locations of local gradient maxima above each of a plurality of thresholds, at each of a plurality scales.

21. The computer readable medium of claim 19, further comprising computer executable instructions defining the step of:
    detecting voxels within a predetermined intensity range, wherein the step of detecting a plurality of initial lymph node center candidates in the 3D medical image using a trained first lymph node center detector is constrained to the detected voxels within the predetermined intensity range.

22. The computer readable medium of claim 17, wherein the computer executable instructions defining the step of segmenting a plurality of lymph node candidates in the 3D medical image comprise computer executable instructions defining the step of:
    fitting a Gaussian Markov Random Field shape model to the 3D medical image at each of the lymph node center candidates.

23. The computer readable medium of claim 22, wherein the Gaussian Markov Random Field shape model is a sphere having a plurality vertices on a surface of the sphere, and the computer executable instructions defining the step of fitting a Gaussian Markov Random Field shape model to the 3D medical image at each of the lymph node center candidates comprise computer executable instructions defining the step of, for each lymph node center candidate:
    determining a distance between the lymph node center candidate and each of the vertices of the shape model by minimizing an energy function having a data term based on intensities in the 3D medical image and a shape term based on the Gaussian Markov Random Field shape model.

24. The computer readable medium of claim 17, wherein the computer executable instructions defining the step of detecting at least one lymph node from the segmented lymph node candidates by verifying the segmented lymph node candidates using a trained lymph node classifier comprise computer executable instructions defining the steps of:

(a) extracting a plurality of features from each of the segmented lymph node candidates;
(b) determining a probability score for each of the segmented lymph node candidates based on the extracted features using the trained lymph node classifier;
(c) detecting one of the segmented lymph node candidates having the highest probability score above a threshold as a lymph node;
(d) removing any segmented lymph node candidates having a center located within a bounding box associated with the one of the segmented lymph node candidates detected as a lymph node; and
(e) repeating steps (c) and (d) until one of no segmented lymph node candidates remain having a probability score above the threshold and a maximum number of detected lymph nodes is reached.

25. The computer readable medium of claim 24, wherein the computer executable instructions defining the step of detecting at least one lymph node from the segmented lymph node candidates by verifying the segmented lymph node candidates using a trained lymph node classifier further comprise computer executable instructions defining the step of:
removing any of the segmented lymph node candidates smaller than a predetermined size prior to step (a).

* * * * *